United States Patent
Stevens et al.

(10) Patent No.: US 7,675,422 B2
(45) Date of Patent: *Mar. 9, 2010

(54) NETWORKED RF TAG FOR TRACKING PEOPLE BY MEANS OF LOYALTY CARDS

(75) Inventors: John K Stevens, Stratham, NH (US); M Jason August, Toronto (CA); Paul Waterhouse, Selkirk (CA); Kenneth Truong, Scarborough (CA); Christopher W Verge, Hamilton (CA); Michael J Vandenberg, Erin (CA)

(73) Assignee: Visible Assets, Inc., Mississauga, Ontario (CA)

( * ) Notice: Subject to any disclaimer, the term of this patent is extended or adjusted under 35 U.S.C. 154(b) by 310 days.

This patent is subject to a terminal disclaimer.

(21) Appl. No.: 11/677,037

(22) Filed: Feb. 20, 2007

(65) Prior Publication Data

US 2009/0058646 A1    Mar. 5, 2009

Related U.S. Application Data

(63) Continuation-in-part of application No. 11/461,433, filed on Jul. 31, 2006, now Pat. No. 7,277,014, which is a continuation-in-part of application No. 11/276,216, filed on Feb. 17, 2006, now Pat. No. 7,164,359, which is a continuation of application No. 10/820,366, filed on Apr. 8, 2004, now Pat. No. 7,049,963, application No. 11/677,037, which is a continuation-in-part of application No. 11/423,509, filed on Jun. 12, 2006.

(60) Provisional application No. 60/461,562, filed on Apr. 9, 2003, provisional application No. 60/595,156, filed on Jun. 10, 2005, provisional application No. 60/707,218, filed on Aug. 10, 2005, provisional application No. 60/725,334, filed on Oct. 2, 2005, provisional application No. 60/596,527, filed on Oct. 3, 2005, provisional application No. 60/744,524, filed on Apr. 10, 2006.

(51) Int. Cl.
G08B 21/22    (2006.01)
G08B 21/18    (2006.01)

(52) U.S. Cl. ............ 340/573.1; 340/572.1; 340/539.11; 340/539.13; 340/539.26; 340/825.49; 340/573.4

(58) Field of Classification Search ............. 340/572.1, 340/572.4, 573.1, 573.4, 539.11–539.19, 340/539.32, 825.49
See application file for complete search history.

(56) References Cited

U.S. PATENT DOCUMENTS

| | | | |
|---|---|---|---|
| 4,190,830 | A | 2/1980 | Bell |
| 4,750,197 | A | 6/1988 | Denekamp et al. |
| 4,961,028 | A | 10/1990 | Tanaka |
| 5,517,188 | A | 5/1996 | Carroll et al. |
| 5,519,381 | A | 5/1996 | March et al. |
| 5,920,287 | A | 7/1999 | Belcher et al. |
| 5,969,595 | A | 10/1999 | Schipper et al. |
| 6,127,976 | A | 10/2000 | Boyd et al. |
| 6,195,006 | B1 | 2/2001 | Bowers et al. |
| 6,236,911 | B1 | 5/2001 | Krueger |
| 6,280,544 | B1 | 8/2001 | Fox et al. |
| 6,294,997 | B1 | 9/2001 | Paratore et al. |
| 6,318,636 | B1 | 11/2001 | Reynolds et al. |
| 6,329,944 | B1 | 12/2001 | Richardson et al. |
| 6,354,493 | B1 | 3/2002 | Mon |
| 6,373,389 | B1 * | 4/2002 | Przygoda et al. ......... 340/572.4 |
| 6,377,203 | B1 | 4/2002 | Doany |
| 6,452,340 | B1 | 9/2002 | Morrissey et al. |
| 6,496,806 | B1 | 12/2002 | Horwitz et al. |
| 6,512,478 | B1 | 1/2003 | Chien |
| 6,608,551 | B1 * | 8/2003 | Anderson et al. ......... 340/10.51 |
| 6,720,883 | B2 | 4/2004 | Kuhr et al. |
| 6,724,308 | B2 | 4/2004 | Nicholson |
| 6,745,027 | B2 | 6/2004 | Twitchell, Jr. |
| 6,927,687 | B2 | 8/2005 | Carrender |
| 7,034,683 | B2 * | 4/2006 | Ghazarian ................. 340/568.1 |
| 7,049,963 | B2 | 5/2006 | Waterhouse et al. |
| 7,138,920 | B2 * | 11/2006 | Nyfelt ....................... 340/573.1 |
| 7,164,359 | B2 * | 1/2007 | Waterhouse et al. ..... 340/572.1 |
| 7,327,250 | B2 | 2/2008 | Harvey |

2006/0128023 A1  6/2006  Waterhouse et al.

FOREIGN PATENT DOCUMENTS

WO          2006035401 A2    4/2006

* cited by examiner

*Primary Examiner*—Davetta W Goins
*Assistant Examiner*—Anne V Lai
(74) *Attorney, Agent, or Firm*—Larson & Anderson, LLC

(57) ABSTRACT

The invention disclosed provides a method, system, and associated tag for detection and tracking of inanimate and animate objects. The novel method broadly comprises the steps of: a) attaching a low radio frequency detection tag to each of the objects, each tag comprising a tag antenna operable at a low radio frequency not exceeding 1 megahertz (preferably not exceeding 300 kilohertz), a transceiver operatively connected to the tag's antenna, the transceiver being operable to transmit and receive data signals at the low radio frequency, a data storage device operable to store data comprising identification data for identifying said detection tag, a programmed data processor operable to process data received from the transceiver and the data storage device and to send data to cause the transceiver to emit an identification signal based upon the identification data stored in said data storage device, and an energy source for activating the tag's transceiver and data processor; b) storing, in the data storage device of each tag, shipping data selected from object description data, address-of-origin data, destination address data, object vulnerability data, and object status data; c) commingling the objects in a repository selected from a warehouse and a truck, the repository being provided with at least one large loop field antenna operable at said low radio frequency; the field antenna being disposed at a distance from each object that permits effective communication therewith at the low radio frequency, d) reading the identification data and shipping data from the transceiver of each tag by interrogating all tags commingled in said repository with data signals, such as specific IP addresses or other identification codes, via said field antenna; and e) transmitting the identification data and shipping data from each tag to a central data processor to provide a tally of the objects in said repository.

22 Claims, 10 Drawing Sheets

STEP 1
Handheld Reads
Way Bill Barcode
Or ID in Warehouse

STEP 2
Tag Placed On Freight +
Function + ID
Programmed
Via Handheld

STEP 3
Handheld Transfers
Data
To Server (Hardline or
Loop Modem)

STEP 4
Server + Base Station
interrogates Tags Via
Base Station
Confirms ID + Status
In Truck + Warehouse

TAG FUNCTIONS AND FEATURES

1. Internal Transaction Data Log (Reads Writes + GPS)
2. Internal Temp Data Log (one month @ 1/hr)
3. Internal Humidity Data Log (one month @ 1/hr)
4. Internal Tilt Data Log (Events Log as needed)
5. Internal Jog Data Log (Events Log as needed)
6. Paperless Electronic Waybill
7. Automatic Freight Sort Based on Electronic Waybill
8. Real Time Freight Tracking (Trucks + Warehouse)
9. Real Time Truck Manifest
10. Real Time Data Logs
11. Real Time Web Enabled Reports ("8-"11")
12. Pick/Put Sorts of Freight (LED based)
13. Low Cost Tags (4 micron CMOS IC's)
14. Low Power Extended Battery Life (15 years)
15. Low Cost Handhelds
16. Network of Tags within Loop
17. Individual Tag Reads and Writes (e.g. Conveyor)
18. Fully Programmable ID
19. No Fixed ID Required
20. Tags Secure On Package Using TAF
21. Tags "Retrievable" upon Delivery
22. Tags "Reusable" 100,000 or more Transactions.

FIG. 10

NETWORKED RF TAG FOR TRACKING PEOPLE BY MEANS OF LOYALTY CARDS

CROSS-REFERENCE TO RELATED APPLICATIONS

The present application is a continuation-in-part of U.S. application Ser. No. 11/423,509 filed Jun. 12, 2006, which claims the benefit of U.S. application Nos. 60/707,218 filed Aug. 10, 2005, 60/725,334 filed Oct. 10, 2005, 60/596,527 filed Oct. 3, 2005, and 60/744,524 filed Apr. 10, 2006, all of which are incorporated herein by reference for all purposes.

The present application is a continuation-in-part of U.S. application Ser. No. 11/461,443 filed Jul. 31, 2006, which is a continuation-in-part of U.S. application Ser. No. 11/276,216 filed Feb. 17, 2006, which is a continuation of U.S. application Ser. No. 10/820,366 filed Apr. 8, 2004, which claims the benefit of U.S. application No. 60/461,562 filed Apr. 9, 2003, all of which are incorporated herein by reference for all purposes.

FIELD OF THE INVENTION

This invention relates to a system and method for detecting and tracking packages, freight, animals, people, and other animate and inanimate objects. The invention also relates to novel radio frequency detection tags which are capable of communicating data, such as identification and positional data. In a preferred application, the novel tags can give active pre-emptive status warning about damage (e.g. due to shock) or a deteriorating condition (e.g. overheating) of the objects to which they are attached.

BACKGROUND OF THE INVENTION

Hundreds of detection devices that make use of radio frequency, have been developed for use in various detection applications, such as tracking animals, for identification of humans within secure areas, and for remote data logging and data collection, tracking of freight, payment of tolls on toll roads. Some of these devices are called RFID Tags, or RF Tags and are often designed to replace fixed barcodes or ID's in many processes. RFID and RF Tags can be categorized into two separate types:

RFID Tags are passive, and can be typified as low cost (as low as 10 cents), fixed ID, disposable and usually short range. Some are long range but can have only a single tag in the reading field. However, anti-collision methods can be used to read with groups of up to 500 tags within a reading field and it is possible to extend the detection range to miles. RFID detection tags work in frequency ranges of 100 Khz to 3 Ghz. (see U.S. Pat. No. 5,517,188, incorporated herein by reference).

RF Tags are active. They typically add a battery to the typical RFID design discussed hereinabove to enable longer reading ranges without powerful readers, and to enable digital clocks, memory, optional programmable ID. Cost can be as high as $1,000 and as low as $5, typically priced in range of $40. They typically work in a frequency range of 15 Mhz to 3 Ghz.

RFID tags and RF tags both operate as transponders—like an electronic mirror. The basic operating principle is that energy from the antenna of the reader generates an electromagnetic field, which induces a voltage in the coil of the tag and supplies the tag with energy. Data transmission from the reader to the tag is done by changing one parameter of the transmitting field (amplitude, frequency or phase) and reflected back. The tag digitally communicates back to the reader by reflecting the electro-magnetic filed back to the transmitter.

In most cases RFID and RF tags have a fixed ID which cannot be altered. The electronic reader is placed in critical area where it can read this ID when the tag is activated by the reader, in much the same way as a barcode is scanned by a barcode scanner at a supermarket. In some cases the RF tag can be programmed providing it is removed to an isolated area so that the programmer sees only a single tag, or the providing programmer has prior knowledge of the fixed ID contained in the tag, or a special encoded signal is used for programming (see U.S. Pat. No. 5,517,188, incorporated herein by reference).

These "transponder tags" all have many advantages. The RFID passive versions can cost as low as 10 cents and can, in effect, replace paper barcodes (see U.S. Pat. No. 6,280,544, incorporated herein by reference). The range and distance to read a tag is determined by the tag size and the power and frequency of the signal from the reader. It is possible to develop specialized high frequency transponder tags that can be read from miles away with a powerful high frequency signal or even from a radar scan. A stand-alone transmitting tag with its own transmitter, instead of modulation of a reflective high frequency signal would consume far too much power, for these long range applications. Low frequency (50 Khz to 500 Khz) transponder tags have short ranges, but may have cost advantages and may be readable even when attached to metal shipping containers or steel railroad cars. In most tracking applications a standalone two way transmitter and receiver as opposed to a transponder based system used in RF Tags and RFID tags would have too many disadvantages: too expensive, limited range, and require complex transmission RF circuitry, including crystals, and have high power consumption since all transmission power must come from the tag as opposed to the reader's interrogation signal.

A major disadvantage of all transponder based tag designs is that special anti-collision methods (see U.S. Pat. Nos. 6,377,203; 6,512,478; 6,354,493; 5,519,381, all incorporated herein by reference) must be used to read more than one tag within a reader's transmitted field, or alternatively a short range reader must be used to individually address each tag within the larger field (see U.S. Pat. No. 6,195,006, incorporated herein by reference). Also, to program a RF tag requires either a special signal and the tag must be isolated from other tags (only one in the field) or special hardware must be used. This makes difficult any "networks" of tags and real time inventory or automated real-time detection and tracking of many items all contained within a truck or warehouse for example difficult. It also makes impossible a network of interactive tags able to freely transmit, be programmed and receive as is the case in any conventional network, and the possibility of real-time freight tracking using the internet is difficult. A second major disadvantage is that to obtain long ranges (100 1,000 feet), higher frequencies are required, and these lead to high power consumption. This power may come from higher activation power of the transmitter signal to the RFID transponder, or from a battery contained within the RF transponder. The batteries are high capacity large (e.g. AA or C alkaline) and life is limited in these applications. Either special measures must be used to either conserve battery life (see U.S. Pat. No. 6,329,944, incorporated herein by reference) or special methods must be used that minimize power for even simple things like clocks or timers (see U.S. Pat. No. 6,294,997, incorporated herein by reference) in RFID or RF Tags.

Finally, active RF tags are typically larger (½ inch thick 4".times.5") and expensive (over $50/unit) because of the battery size. Thin versions typically have limited battery life (two years). Active tags may be use to locate the palett or shipment within a warehouse, as well as for tracking its progress through a supply chain. Several tags have been developed to include limited data tracking as well as the ability to remotely transmit the data. These tags however do not contain LED's or Displays buttons of any kind, and again represent, in effect, electronic smart barcodes.

SUMMARY OF THE INVENTION

The present invention broadly provides a system for detection and tracking of inanimate and animate objects, the aforesaid system comprising: a) a low radio frequency tag carried by each of the objects, said tag comprising a tag antenna operable at a low radio frequency not exceeding 1 megahertz, a transceiver operatively connected to said antenna, said transceiver being operable to transmit and receive data signals at said low radio frequency, a data storage device operable to store data comprising identification data for identifying said detection tag, a programmed data processor operable to process data received from said transceiver and said data storage device and to send data to cause said transceiver to emit an identification signal based upon said identification data stored in said data storage device, and an energy source for activating said transceiver and said data processor; b) at least one field antenna disposed at an orientation and within a distance from each object that permits effective communication therewith at said low radio frequency; c) a reader in operative communication with said field antenna, said reader being operable to receive data signals from said low frequency tags; d) a transmitter in operative communication with said field antenna, said transmitter being operable to send data signals to said low frequency tags; and e) a central data processor (e.g. server) in operative communication with said reader and transmitter.

Preferably, the aforesaid low radio frequency does not exceed 300 kilohertz.

According to a preferred embodiment, the aforesaid field antenna, reader, and transmitter are combined into a unitary handheld device (as shown in FIGS. 7 and 8).

The aforesaid field antenna preferably comprises a large loop, and the distance from the field antenna to each object preferably does not exceed a major dimension of said loop. Where the large loop is substantially circular, the major dimension represents a diameter thereof.

According to a preferred embodiment, the aforesaid identification data comprises an internet protocol (IP) address, and the central data processor is operable for communication with an internet router.

Preferably, the tag further comprises a sensor operable to generate a status signal upon sensing a condition (e.g. temperature change, shock, dampness) experienced by an object that carries the detection tag, the transceiver being operable to automatically transmit a warning signal at said low radio frequency upon generation of the status signal. Preferably, the sensor comprises a GPS detector to help locate the tag and its associated object.

According to a preferred embodiment, the tag further comprises at least one indicator device (e.g. colored LED, audible tone generator) which is automatically operable upon receipt by said transceiver of a data signal that corresponds to said identification data stored at said data storage device. Where the tag is provided with the aforesaid sensor, the indicator device may also be automatically operable upon generation of its status signal.

Preferably, the tag may further comprise both (i) a sensor operable to generate a status signal upon sensing a condition (e.g. temperature change, shock, dampness) experienced by an object that carries the detection tag, and (ii) a clock to generate a time signal corresponding to the status signal, the data storage device being operable to store corresponding pairs of status and time signals as a temporal history of conditions experienced by the object. Advantageously, the tag's transceiver can then be operable to automatically transmit that temporal history at the aforesaid low radio frequency upon receipt by the transceiver of a data signal that corresponds to said identification data stored at the data storage device.

According to a preferred embodiment, the detection tag can further comprises a display (e.g. LCD) operable to display data relating to said tag and to an object carrying said tag.

Moreover, the tag can further comprise key buttons operable for manual entry of data.

Preferably, the novel tag can be formed with two major surfaces at opposite sides thereof, a first major surface on a first side of the tag is substantially flat to facilitate attachment to a surface of an object, while a second major surface of the tag can be substantially convex. Moreover, the second major surface can be tapered to a thin edge along a perimeter of said tag, thereby reducing the likelihood that the tag could catch against an obstruction and be ripped away from its object. Moreover, the tag can be provided with a transparent film overlying the second major surface, the film being removably adherent to the object while permitting visual inspection of the aforesaid second major surface.

Preferably, the tag can be provided with key buttons for manual entry of data, the second major surface can be provided with an LCD display and at least one LED indicator device.

Preferably, the tag's first major surface can be provided with the aforesaid key buttons, which can have frictional (e.g. rubberized) surfaces for reducing slippage with respect to said object. Also, at least one of the key buttons can be operable to automatically electronically detect whether or not the tag is in contact with a package or other object.

According to a preferred embodiment, the transceiver can be normally ON to receive data signals. Moreover, the programmed data processor of the tag is preferably operable to compare a transmitted ID code with one or more ID codes programmably stored in the data storage device and, in the event of a match, to respond to said transmitted ID code.

The invention further provides a method for detection and tracking of inanimate and animate objects, the aforesaid method comprising the steps of: a) attaching a low radio frequency detection tag to each of the objects, each tag comprising a tag antenna operable at a low radio frequency not exceeding 1 megahertz, a transceiver operatively connected to said antenna, said transceiver being operable to transmit and receive data signals at said low radio frequency, a data storage device operable to store data comprising identification data for identifying said detection tag, a programmed data processor operable to process data received from said transceiver and said data storage device and to send data to cause said transceiver to emit an identification signal based upon said identification data stored in said data storage device, and an energy source for activating said transceiver and said data processor; b) storing, in the data storage device of each tag, shipping data selected from object description data, address-of-origin data, destination address data, object vulnerability data, and object status data; c) commingling the objects in a repository selected from a warehouse and a truck, said repository being provided with at least one field antenna operable at said low radio frequency; said field antenna being disposed at a distance from each object that permits effective communication therewith at said low radio frequency d) reading the identification data and shipping data from the transceiver of each tag by interrogating all tags in said repository with data signals via said field antenna; e) transmitting the identification data and shipping data from each tag to a central data processor to provide a tally of the objects in said repository.

The tag further preferably comprises a sensor, as discussed hereinabove, operable to generate a status signal upon sensing a condition (e.g. temperature change, shock, dampness, GPS position) experienced by an object that carries the detection tag, the method further comprising the step of: (f) automatically transmitting a warning signal from the tag's transceiver at the aforesaid low radio frequency (e.g. 300 kilohertz) to the server or other central data processor upon generation of the sensor's status signal.

Preferably, the tag comprises both (i) a sensor operable to generate a status signal upon sensing a condition (e.g. temperature change, shock, dampness, position) experienced by an object that carries said detection tag and (ii) at least one indicator device (e.g. colored LED, audible tone generator), the method further comprising the step of: (g) automatically activating said at least one indicator device upon generation of the sensor's status signal.

Preferably, the tag further comprises (i) a sensor operable to generate a status signal upon sensing a condition (e.g. temperature change, shock, dampness, position) experienced by an object that carries the detection tag and (ii) a clock to generate a time signal corresponding to the status signal, the method further comprising the steps of: (h) storing corresponding pairs of status and time signals as a temporal history of conditions experienced by the object; and (j) transmitting, to the central data processor, the temporal history at said low radio frequency upon receipt by said transceiver of a data signal that corresponds to the identification data stored at the data storage device.

Moreover, the invention provides a novel detection tag for detection and tracking of animate and inanimate objects, the aforesaid detection tag comprising: a) an antenna operable at a low radio frequency not exceeding 1 megahertz; b) a transceiver operatively connected to said antenna, said transceiver being operable to transmit and receive data signals at said low radio frequency; c) a data storage device operable to store data comprising identification data for identifying said detection tag; d) a data processor operable to process data received from said transceiver and said data storage device and to send data to cause said transceiver to emit an identification signal based upon said identification data stored in said data storage device; and e) an energy source for activating said transceiver and said data processor.

As will be readily understood, the novel inventive tag may preferably comprise the various characteristics disclosed hereinabove.

BRIEF DESCRIPTION OF THE DRAWINGS

For a better understanding of the invention, various features of preferred embodiments of the novel system, method, and tag, are illustrated in the drawings, as will be described hereinbelow:

FIG. 1b is a cross-sectional view of the RF tag of FIG. 1a;

FIG. 2b is a cross-sectional view of the RF tag of FIG. 2a;

FIG. 3b is a cross-sectional view of the RF tag of FIG. 3a;

FIG. 10 is a table listing of advantages and features of the invention.

DESCRIPTION OF PREFERRED EMBODIMENTS

Figure 1A:
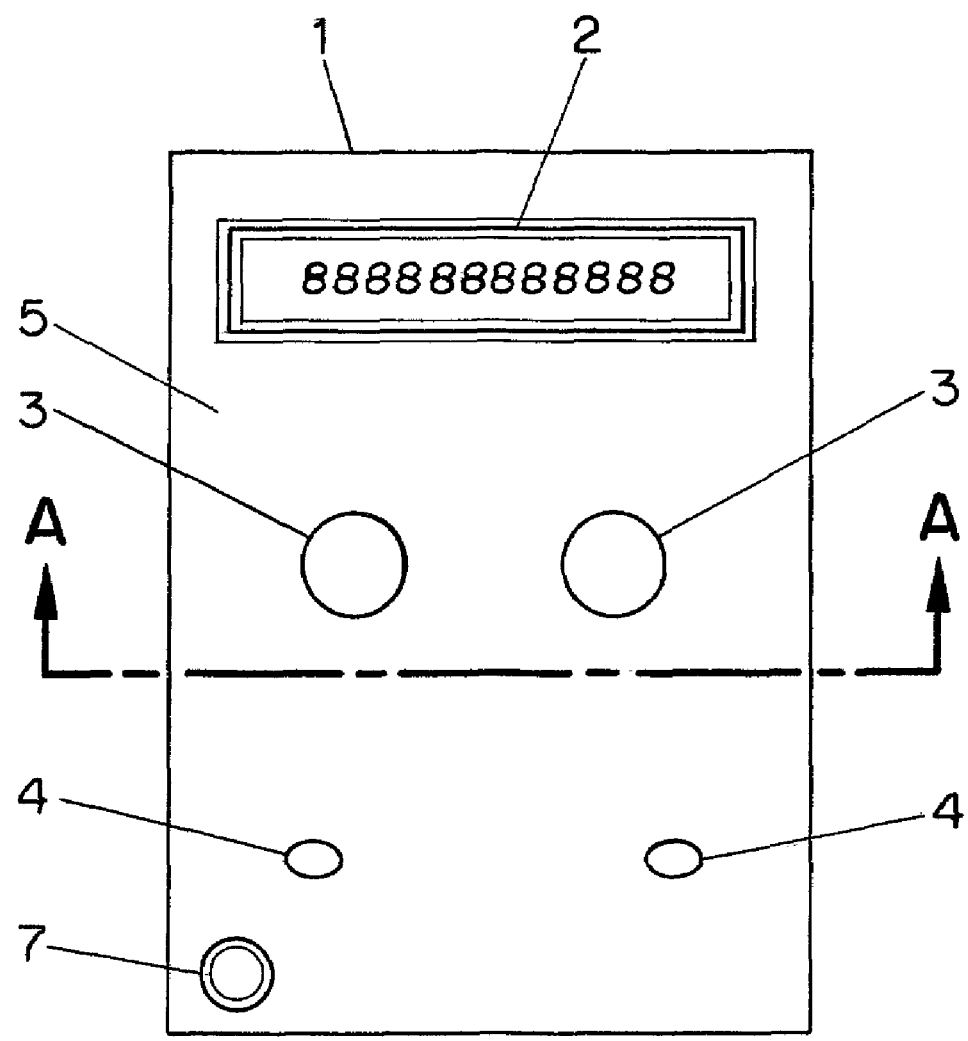
FIG. 1a is a schematic plan view of an RF tag in accordance with a first embodiment of the invention.

We have discovered that by using lower frequencies (not exceeding 1 megahertz, and typically under 300 Khz) and a base station design that uses large loop antennas (such as 10.times.10 feet to 500.times.500 feet) and by transmitting a digital ID to selectively activate a selected client tag, rather than a non-selective signal which would activate many tags simultaneously, we have the ability to read and write to a full network of client tags (which are within the effective range of the loop) using both a simple polled protocol as well as on-demand communications from the client tags. Each such detection tag uses a full duplex transmitter and receive (transceiver), as opposed to transponder design used in RFID tags and RF Tags. In addition, these Networked RF Tags (NRF Tags) have significantly reduced power consumption, and long range (1000 sq feet to 10,000 sq feet per antenna), have the power capacity to add displays (e.g. LCD) and light emitting diodes (LED's) and detectors, and buttons so they may become fully interactive "tag clients" (this is not possible with transponder). These low frequencies are generally understood to have very short range (inches), have the disadvantage of limited transmission speed, but have the distinct advantage of operating in harsh environments with reduced interference (see Mar. 19, 2003 RFID Journal "Goodyear Opts for 125 KHz Tire Tag"). However, the range problem is solved by using full duplex communications and a base station with large loop antennas; moreover, the communication speed is not a serious issues in any of the expected applications.

Low frequencies make it possible to use low speed low-power integrated circuits. These integrated circuits may be fabricated using 4 micron CMOS for only 10 to 20 cents and use a standard flat (quarter size) alkaline battery or a lithium battery. The low frequencies provide extremely low power consumption and make it possible to leave the receiver on at all times, drive an LCD display at all times, transmit back to the base station as many as 100,000 times, yet the tag enjoys a lifetime of a minimum five years to maximum 20 years (lithium battery). The loop antennas have the advantage of communication to modules only contained within the loop, or depending upon the communications mode (AM of FM, or PM) up to one diameter away from the loop. This also makes it possible to estimate the location of an item down to the size of the loop approximately. These non-transponder NRF Tags are novel detection tags which have the ability to transmit and receive in the manner of any radio device and do not depend upon reflection of reader signals.

The NRF Tags have a range of hundreds of feet, and NRF Tags have long battery life (e.g. 10 years) with miniature button batteries, and only one or two active components. They can do this because they use very low frequencies (below 1 megahertz and preferably under 300 kilohertz) for both transmission and reception.

The novel NRF Tag, is low-cost (dollars) with full two duplex way transmission and reception, can be fully programmable within the network, and as many as 10,000 or more can all function within a network as clients, with a ten to fifteen year battery life This tag may be equipped with a LCD display, used for data tracking, and damage control applications. These tags have been specifically designed to easily attach to a package, using tape or other adhesive means. This provides the added advantage of programmability at one site, using a simple hand-held device, attachment to the package at the shipping site, followed by the ability to track the package as well as to log data about the status of the package throughout the entire supply chain. Thus the tag may be used as shipping data to store other shipping information such as addresses, freight contents, weight size, and shipping ID's with full programmable features. The tag has additional unique features including a LCD display that can optionally provide shipping data information about the shipment such as shipping ID or tracking number or other ID number, as well as to light emitting diodes (LED), that can be used for active sorting, and optimal placement either within a warehouse or truck. The tag may also have several buttons placed on its face, that can be used to confirm any action associated with the freight (e.g. it has been sorted or moved), or to scroll information contained in the tag on the LCD display. In addition the tag may be read as it passes through a "reading tunnel", on a conveyor and/or automatically sorted, similar to systems now based on barcodes. Finally, many such tags may be attached to freight stored in a warehouse, and a single large loop antenna, or multiple overlapping loop antennas placed either in the floor or ceiling or on shelves can be used to interrogate the tags, read data, status and find the approximate location of the freight in the warehouse. This ability to Network many NRF Tags as clients within a region makes many other functions possible.

When the freight reaches its destination, the delivery person may optionally remove the tag from the freight, so that it can be reused again by the shipper. Alternatively the tag can stay with the freight and the recipient can take the tag, reprogram it for a return or for another shipment. The design of the tag includes optional rubber buttons placed on the tag back (a flat surface), that may be optionally used to enter a PIN identification numbers either by the shipper and whether recipient prior to attachment to the freight, or after its removal by recipient. This may be used to confirm identities of both shipper and recipient. This same rubber button pattern may also provide for a skid resistant attachment surface to the package, especially if the buttons or made of soft rubber. These buttons also may serve as an electronic detection means that the tag device is actually attached to a package, or has just been removed from the package. For example, the tag's memory could be automatically reset, after the tag is removed from the package by detecting that at least two or three of the rear buttons are then simultaneously depressed and released. Alternatively the same detection system could be used simply to display a message on the LCD that it is now available to be re-programmed and yet not erase memory.

Another unique feature of this system is its ability to be programmed within the network, providing the server knows the ID of the NRF detection tag client, or by a very low-cost hand-held device, in the warehouse, or in the truck, or at the shipper's site; also, an NRF tag can be programmed at the receiver's site with no knowledge of the clients tag's ID. The hand-held and tag communication range may be easily controlled to a few inches or even a few feet depending upon the size of the loop antenna is used for communication contained in the handheld, as well as power supplied to the antennas. This provides the ability for an individual to walk up to a piece of freight with the hand-held, within a warehouse, and interrogate the NRF Tag ID status, or reprogram tag, or carryout any other maintenance function without any prior knowledge of the shipping ID number or any other shipping data or other information that may be contained in a separate database—it is done based simply by locating the physical freight These features will undoubtedly be limited to specific individuals with the authority to make such changes, however this ability makes maintenance in support of the tags low-cost and on the warehouse floor.

In addition, low cost detectors for humidity, angle, temperature, acceleration and jog's (Mercury switches) and GPS may be easily added to the NRF Tag as required. With the addition of internal memory such as a data storage device, data associated with these detectors may be logged over time and stored in the tag for reading and documenting the history the package. This may be particularly important for sensitive high-value electronic items, pharmaceuticals which must be maintained within a narrow temperature range, food items, and other hazardous items or high-valued shipments. In most cases disposable "onetime use" tags used to measure these parameters for freight often the cost more than the cost of this electronic damage detection tag. More importantly these electronic tags provide detailed times and dates when any data parameter changed or an action took place. For example is possible to identify the location and the precise time when a high-value package was dropped.

A final advantage of this system is its ability to transmit to the Base Station, independent of the base station interrogating the NRF Tag—on-demand tag transmission. This makes it possible if a fault occurs or damage occurs, or say the temp is out of range for the tag client to send to the base station an alarm condition.

Communications Protocol

Each NRF tag may have many ID's programmed into its memory. When manufactured all tags have the same-master ID, typically 00000000. The handheld or a special programming device (a base station) connected to a computer with limited range, sends out this unique master ID. The tag has an always on receiver and reads the transmitted ID, it compares this with the ID's contained in its memory and if it finds a match, transmits a signal containing the transmitted ID back to the transmitter, indicating that it is now full open to handle communication. The base station, may than provide the detection tag with one or more unique ID numbers which may simply be a unique tracking number, or other unique ID, as well as any information it may require to function (e.g. instructions to log temperature or physical impacts such as jogs). The tag is also provided with several random numbers stored in its memory that can be used to delay un-solicited transmissions to the base station to minimize likelihood of collisions.

Once programmed the tag may be attached to a piece of freight and placed in a warehouse. In most cases communication is via a simple lolled network system. The Base Station in the warehouse communicates to many thousands of tags located on the floor of the warehouse via a tuned loop antenna. The server attached to the base station sends as part of its transmission the tracking number or unique ID to the entire network of tags, and that number is compared by each tag to the numbers contained in the each tag's memory. If the tag does finds a match for the transmitted number, than the tag replies to the interrogation with that serial number or with the same ID or tracking number. Providing the numbers are unique only a single tag will reply, and full hand-shake communication can be carried out between the tag and the base station. At the end of the transmission, the base station sends a code to indicate it has completed all communication. The server can do a check-up on all tags by simply, polling each tag one after the other with its ID in the same manner as outlined above. The base station may also read and/or harvest the temperature history (logs) or other environmental information history contained in the individual tag's memory.

The novel NRF tags may also initiate communication, by transmitting their ID's to the base station. This could be in response to a button push or in response to an environmental condition (e.g. temperature too high or too low). In the rare case when two tags simultaneously transmit, the ID's will be non-readable and the base station will send out a single indicating an error has occurred. Two possible protocols may be initiated. The tags may be instructed to re-transmit, using a random delay stored in each tag's memory register, to eliminate the overlap. Alternatively, that server may simply poll all NRF tags in the field, one-by-one, until it locates the two tags that transmitted the signals.

APPLICATION EXAMPLES

The simplest application in use of the tag may be simply as a recording of shipping information. Many shipper's have far too low volume of packages to be shipped (three to four week inventory) to justify placing a full shipping system. The average cost for such a system, particularly if it includes a printer, may be thousands of dollars. The same customers however often refuse to fill out a paper waybill. This NRF tag system simplifies shipping for low volume shippers. In its simplest form, this can provide a very low-cost shipping system to low volume shippers, and reduce cost for the courier, and provide enhanced ability to sort, track and bill the customer.

In this example the low volume shipper would be provided a hand-held with a low-cost modem built into the cradle. The hand-held can dial out a phone line to a centrally located server, provide the server with information about shipments and also receive updates as well as a customer list. The shipper would simply remove the hand-held from the cradle scroll down through his personalized address list, and select a correct address. A tag could be placed on the package to be shipped, and the hand-held will program the tag with that address. The NRF tag may record a log of the time it was programmed as well as the identity the person programming. This identity may be confirmed with a PIN number, entered on the hand-held simply by the serial number of the hand-held itself. Other information may also be contained in the tag such as weight size of the package and service desired (next day, three-day, etc.). When the driver picks the package up he may also scan with his hand-held, confirming that it's been picked up. When the package is placed in the truck, it may also be tracked and identified with an antenna in the back in the truck. If the truck is equipped with GPS, the GPS coordinates of the package and the fact that it's been picked up may be transmitted again back to the server confirming time and location of the pickup. Thus the packages in the truck may be confirmed periodically by the computer contained in the truck and transmitted back to the central server; this optionally provides the real-time manifest and real-time tracking for the customer as well as for the courier.

When the package arrives at the distribution center, again the novel NRF tag may be read and identified for tracking purposes using either warehouse antenna or a special reader on a conveyor. This information may be used to automatically sort the package on a conveyor, or it may also be used to manually sort packages. In the manual sort cases all the packages can be placed on a circular conveyor, identified and read by a loop antenna around the conveyor. Once all tags have been identified a sorting program can determine which shipments are to be placed in Truck One for delivery, and the red LED's provided on their attached NRF tags can be flashed. The pickers therefore, simply remove packages on the circular conveyor that have a tag with a flashing red LED and put them in the Truck One. Similarly, the packages for Truck Two may next be identified with the flashing green LED. Again those packages remove the circular conveyor and placed in Truck Two. This procedure can be continued until all packages have been removed and paced into the correct trucks.

Once packages are placed in the correct trucks, they may also be correctly sorted for sequential delivery and then delivered using the same system. For this purpose, the trucks may be equipped with a small server and GPS, and a base station with loop antenna in the back. The packages can be identified by the server as it reads the GPS location of the truck and as the driver approaches a correct GPS-identified delivery address by simply flashing the LED on the corresponding attached NRF tag. It will be understood that each NRF tag and each server may be provided with an internet protocol (IP) address to enable communication and tracking from other internet addresses of the shipper and of the customers. These new NRF tags therefore provide real-time tracking as well as real-time picking and sorting throughout the entire supply chain with virtually no paperwork.

This same sequence can be used for heavier freight on pallets, or even large high-value items placed on long haul trucks. In many cases particularly for high-value pharmaceuticals or confectionery items temperature ranges must be monitored at all times to provide a warning alert for preventing damage (e.g. spoilage). Again this may be done in real-time providing the truck is equipped with GPS and a loop antenna system, or alternatively the tag may simply actively volunteer data important for the shipment. Of course, this data may be harvested to a central computing system via an IP-address-equipped server once the shipment reaches its destination These NRF tags may also be used to identify and monitor individuals who are allowed entry into high security areas of using the same basic systems described above, and track individuals within buildings as they move from place to place. On the face of the tag in this case could be flat and contain picture ID, and the back could retain the button array. At critical entry points the user may, for example, be required to enter in a PIN number using buttons on the NRF tag as his positive identification. In marketing generally and in retailing more specifically, a loyalty card, rewards card, points card, or club card is a plastic or paper card, visually similar to a credit card or debit card, that identifies the card holder as a member in a commercial incentives program. In the United Kingdom it is typically called a loyalty card, in Canada a rewards card or a points card, and in the United States either a discount card, a club card or a rewards card. Cards typically have a barcode or magstripe that can be easily scanned. Small keyring cards are often used for convenience.

Loyalty cards may be read, in the case of a hotel loyalty card program, in the lobby of the hotel, in order for the hotel to be advised that a specific client/hotel guest has arrived and that specific preferences can be highlighted relating to that hotel guest (e.g. wake up calls, restaurant bookings, room service, table seating). Pop up windows may be used as part of the hotel management software to alert the concierge or hotel staff that the guest has arrived at the hotel. Other areas or regions within or external to the hotel (e.g. pool area or tennis area) may be similarly equipped with volume read loop antennas according the present invention.

The loyalty card may for example be the customer loyalty or affinity card 57 described in the above-mentioned U.S. application Ser. No. 11/423,509 filed Jun. 12, 2006, at page 8, lines 5-7, at page 12, lines 5-6, and in FIG. 4 thereof, which application is assigned to the same assignee as the present application.

DETAILED DESCRIPTION OF PREFERRED EMBODIMENTS

Figure 1B:
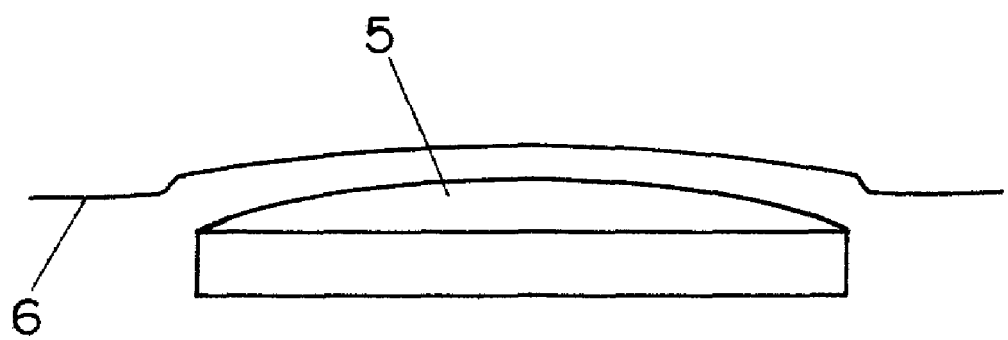

An embodiment of a freight damage alert RF tag 1, in accordance with the invention, is shown in FIG. 1a, which illustrates the front of RF tag 1, and FIG. 1b, which shows a cross-section A-A thereof. This front view includes an optional LCD display 2, an optional set of buttons 3, and an optional set light emitting diodes (LED) 4. The LED's may be different colors. The display 2 can be used to show the waybill number, or other shipping information, while the buttons 3 can be used to confirm actions in the warehouse or truck or alternatively may be used to scroll information up-and-down on the display 2. The LED's 4 are useful for picking and putting freight both in the warehouse as well as in the truck. Tag 1 may be provided with a hole 7 to help attach the tag to freight packages.

One unique feature of the design is that the face 5 of the tag 1 is convexly curved to a thin peripheral edge so that conventional tape or specialized transparent adhesive film (TAF) 6 can be used to hold the tag in place on the package with no exposed edges. The curved face 5 offers a strong surface for the adhesive on the tape or TAF 6 and does not provide any edges so the tag 1 can be knocked off the package. However the tag 1 may be easily removed when necessary by simply grabbing the corner of the tape 6 and peeling off. This makes it easy to retrieve the tag 1 upon delivery if necessary. It also makes it easy to recycle tags for use on many packages and many repeated uses. Moreover, a suitable device or means 8 may conveniently be provided for attaching the back of tag 1 to a freight package.

Tags 1 may also introduced that have no LCD display 2, no buttons and no LEDs 4 at a reduced cost. These inexpensive NRF tags may be used simply to data log the status of the package throughout its shipment lifecycle.

Figure 2A:
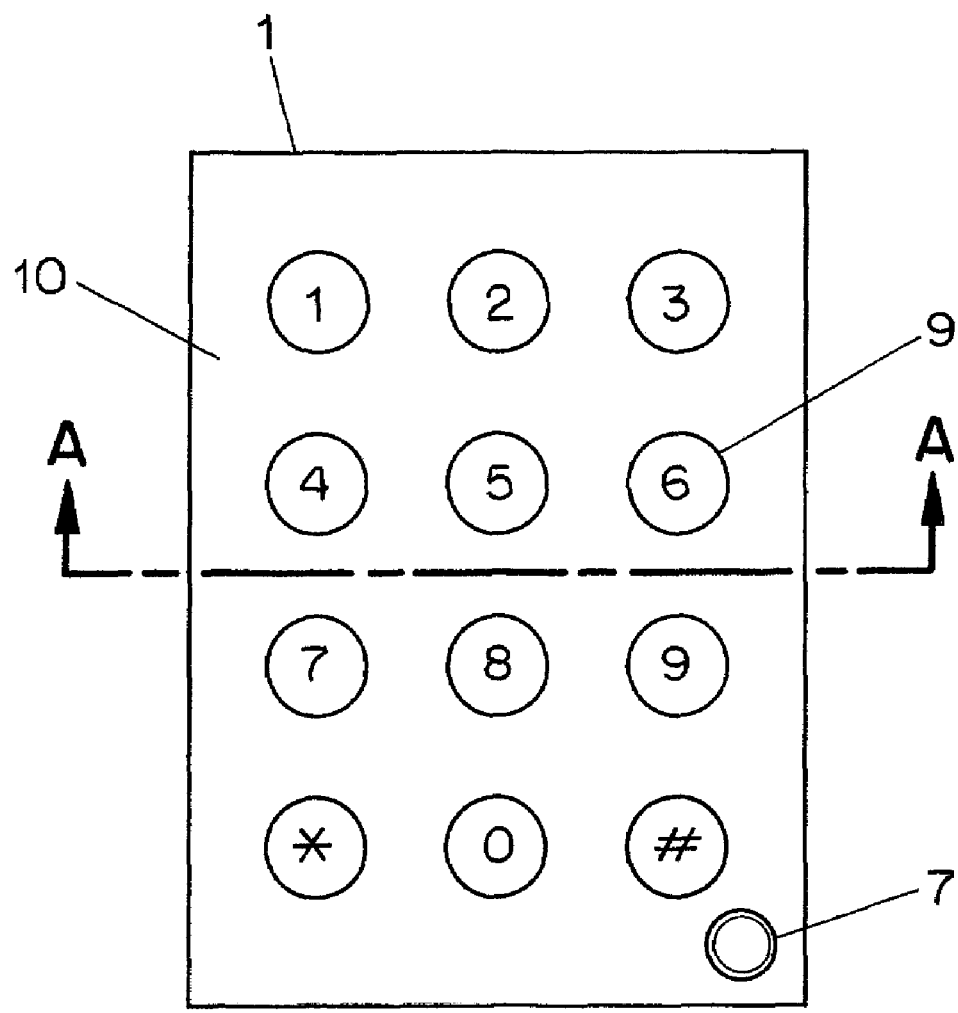
FIG. 2a is a schematic plan view of the back of an RF tag in accordance with a second embodiment of the invention.
Figure 2B:
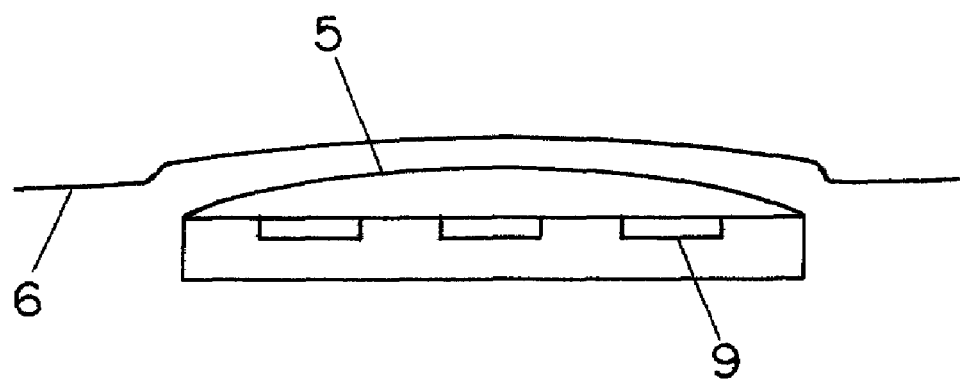

FIG. 2a shows the back view of freight damage alert tag 1, while FIG. 1b shows a cross-section along A-A thereof. Buttons 9 may be optionally placed on the flat back surface 10 of the tag. These buttons 9 may be of soft rubber and, as a result, may offer a cushioned back making it more difficult for the tag 1 to move laterally on the package surface after attachment. Additionally these buttons 9 may also be used to detect the fact that the tag is actually attached to the package. It more than one button 9 is depressed or it becomes clear to the microprocessor provided on tag 1 (see FIG. 4) that the tag 1 is in direct contact with a surface of some kind, such as a freight package, and the pressure has been applied that is necessary to depress all buttons 9.

The same buttons may also be used to confirm identity of the shipper or recipient via PIN numbers. For example the truck driver may deliver the freight to a recipient, remove the tag 1 and ask the recipient to enter a PIN number on the keypad of buttons 9. Alternatively, the keypad 9 on the back 10 may be used to actually program the tag 1 for a specific destination. The shipper may have a list of destinations printed on a piece of paper each with a unique two digit ID. He may enter the two digit number on buttons 9 followed by the "#" sign to program the shipper's address in the tag 1 That number then appears on the LCD 2 to confirm that it has been programmed for that destination and the shipper may attach tag 1 to the package. This eliminates the need for a shipping system as well as even a low cost hand-held reader. This can significantly reduce cost and save time for both the shipper the courier in the recipient.

Figure 3A:
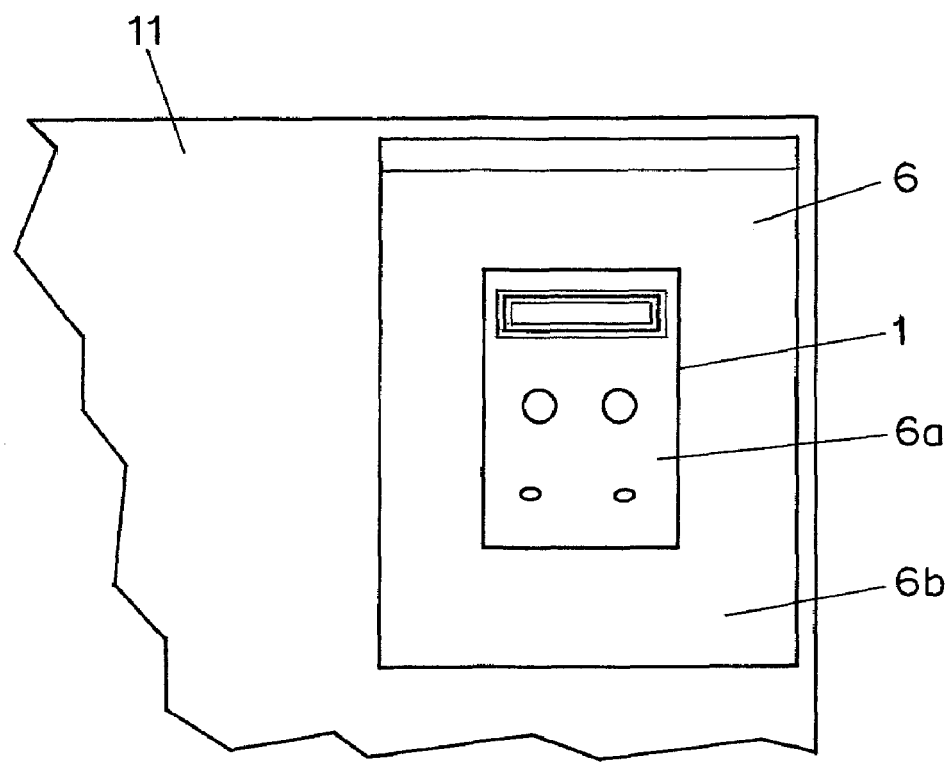
FIG. 3a is a schematic plan view of an RF tag in accordance with the invention, showing its attachment to a surface of a freight box.
Figure 3B:
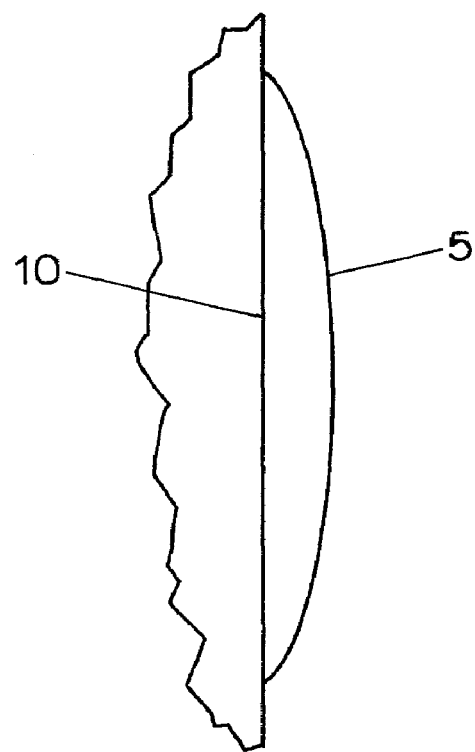

FIG. 3 shows the shape of tag 1 in the preferred attachment means for the tag. As can be seen, the front face of tag 1 a gentle curved from the top bottom and left edge to form an ellipse. This provides a continuous surface with the package for transparent adhesive film (TAF) 6 to make contact and hold the tag 1 in place (on freight package/box 11) without any exposed tag edges. Sharp edges can lead might be caught during shipment and accidentally knock the tag from the face of the package. This system makes it easy to stick tag 1 on the surface of the package at a very low-cost, and also to remove the tag 1 when necessary.

It is also optionally possible to emboss an area 6a in the TAF attachment means 6 to the actual shape of the tag 1 so that the thickness of the tape 6 may be increased and conform to the shape of the tag 1. These adhesive attachment films 6 may be attached to waxed heavy backing paper and provided to the customers so that attachment becomes quick and easy. It may also be possible in some cases to add an additional piece of transparent film in front of the adhesive film to form an envelope 6b. This envelope 6b can be used for waybill's and other paper, particularly useful if the tag does not have a LCD 2 or other optional features.

Figure 4:
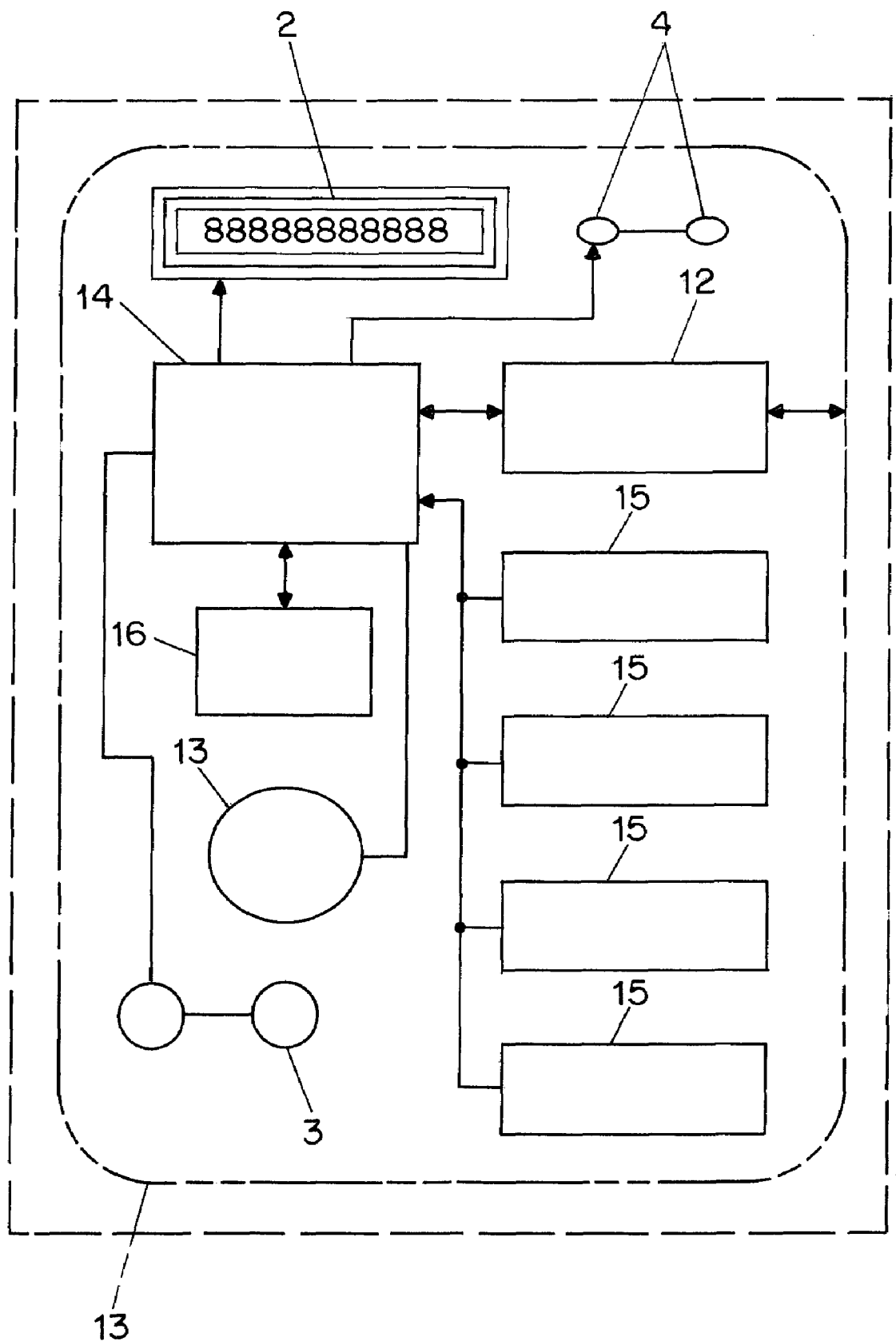
FIG. 4 is a schematic block diagram depicting the functional components of an RF tag in accordance with the invention.

FIG. 4 is a block diagram showing functional components of a typical freight damage alert tag 1. The heart of the freight damage alert tag is a custom radio frequency modem 12, created on a custom integrated circuit using 4 micron CMOS technology. This custom modem 12 is designed to communicate (transmit and receive), through a loop antenna 13, made of thin wire wrapped many times around the outside edge of the tag 1. All communications take place at very low frequencies (e.g. under 300 kHz). By using very low frequencies the range of the tag 1 is limited; however power consumption is also greatly reduced. The receiver of modem 12 may be on at all times and hundreds of thousands of communication transactions can take place, while maintaining a life of many years (e.g. up to 15 years) for battery 13. The typical freight NRF tag 1 may also include a memory 16 and a four bit microprocessor 14, using durable, inexpensive 4 micron CMOS technology and requiring very low power, with onboard LCD drivers, to control and drive the LCD display 2, as well as drivers for the LED's 4 and the ability to detect and read analog voltages from various optional detectors 15 and read inputs from buttons 3. For example, the tag 1 may contain a humidity detector and angle detector temperature detector a jog detector.

Figure 5:
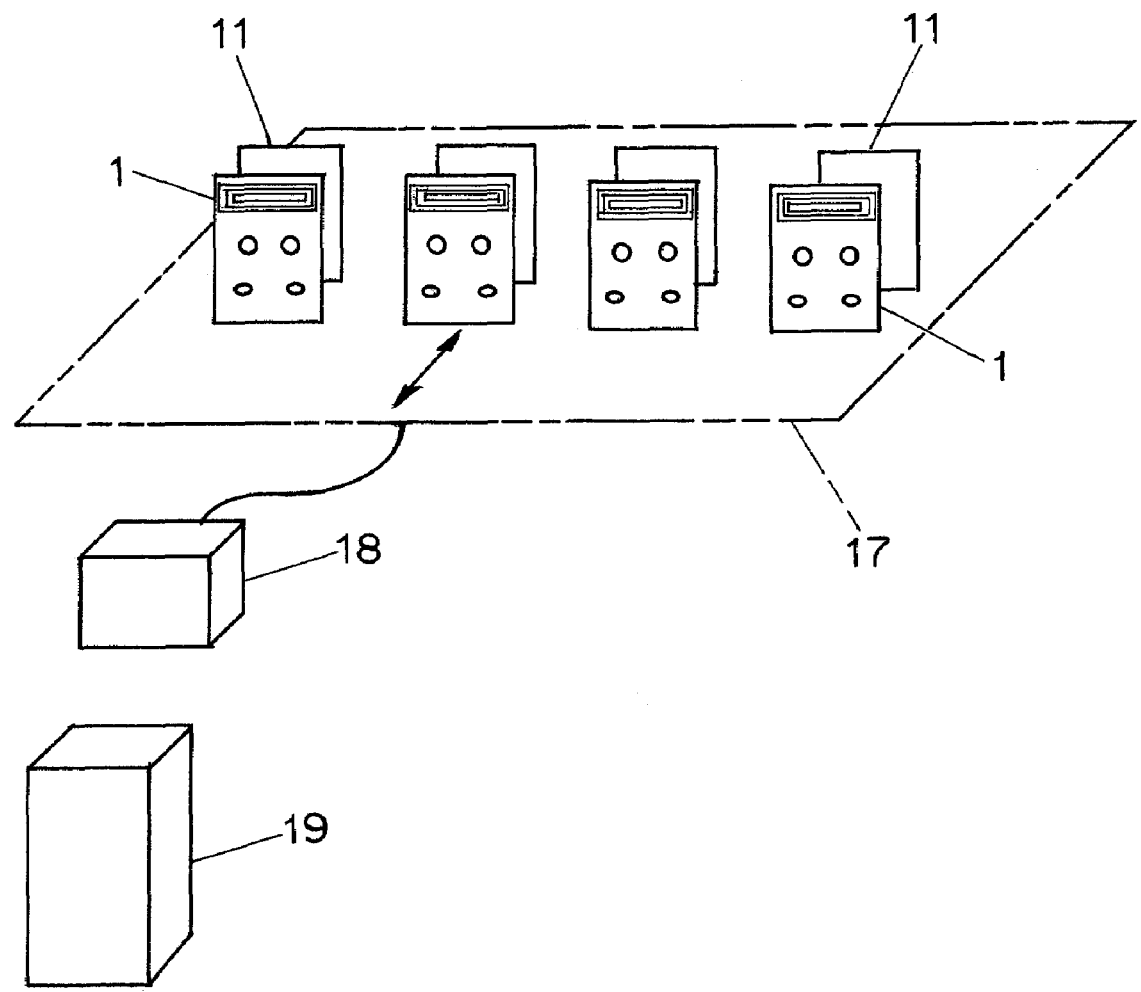
FIG. 5 is a schematic view of a number of low frequency RF tags attached to freight packages in a warehouse repository, together with a large loop antenna and other components for reading the tags and communicating the information.

FIG. 5 shows how these novel NRF tags 1 may be placed as clients within a network served by larger loop antenna 17 in a warehouse setting. The larger antenna 17 may be placed in the floor ceiling or around shelves containing the freight 11. One additional advantage of using low-frequency communication for the system, is the fact these low (e.g. 300 kHz) frequencies do not reflect from steel or metal. In fact, they are often enhanced and refocused effectively by steel shelves or other large iron frames. In many cases the antenna 17 may simply be wrapped around large steel shelves and the tags 1 will all be contained in the inductive low-frequency field. The loop antennas 17 can be up to several hundred feet square. However, as they get larger, the ability to detect an individual tag 1 decreases, and the power required to transmit to the tags 1 increases. Low-frequency communication has relatively low noise with antennas 17 in the range of 100 feet by hundred feet, however at 500 feet by 500 feet they began to detect thunderstorms occurring at a distance—often within 4 or 500 miles away from the antenna 17. Thus, the optimal size for these antennas 17 is on the order of about 100 by 100 feet. However many such antennas 17 can be placed within a warehouse to create a checkerboard array for communication to any point. This also makes it possible to localize a specific tag 1 within a large warehouse at least within the distance of an antenna square. A single base station 18 can be used to connect to all such antennas 17 by time division multiplexing, or the like.

The antenna 17 is connected to a base station 18 which in turn is connected to a server 19 or computer controlling mechanism. The base station 18 is able to transmit and receive at much higher power than the tags 1, but as long as the tags 1 are contained within a loop 17, base station 18 can identify and talk to each tag 1 individually. The optimal protocol for this network is for the base station 18 to address the tag 1 based on a known ID. In other words the optimal protocol requires that the server 19 have a database of IDs found in the loop antenna 17 when using networks of tags 1. As will be understood, for addressing of an individual tag 1 from the internet, the tag 1 may be provided with an IP address.

However, it is possible to actively talk to each tag 1 individually and program it to not respond to a given, signal transmitted by the base station 18—a chirp command. In other words this chirp command tells all tags 1 that unless they have been programmed to not respond with their ID, to respond with their ID. If a tag 1 exists in the loop 17 that is not in the database it will transmit its ID with the chirp command. If multiple tags 1 exist in the database with unknown IDs they will talk together, and the base station 18/server 19 combination can detect an ID collision. It is then possible to retransmit the chirp signal, but have the tags 1 transmit back with a random delay, so that ID's do not overlap this process may be repeated until all IDs are the found within the loop 17. Other standard methods used in networks may be used to carry out by "binary" searches, to illuminate certain addresses until all tags 1 again are identified. In most routine cases however the servers 19 will have prior knowledge from the hand-held reader or other sources of tags and all IDs contained in the loop.

The server 19 may, on a periodic basis, interrogate each tag 1 to obtain a current temperature, status button pushes, etc. The same server may also selectively flash LEDs to indicate that the package or piece of freight 11 should be moved to another area, or can selectively flash LEDs to indicate which packages are placed first in a truck, or can selectively flash LEDs and change the display to provide other information or workers on the warehouse floor.

Moreover, it should be understood that once a package is removed from the loop, the server can detect that it has been removed and indicate that it is no longer in the database.

Figure 6:
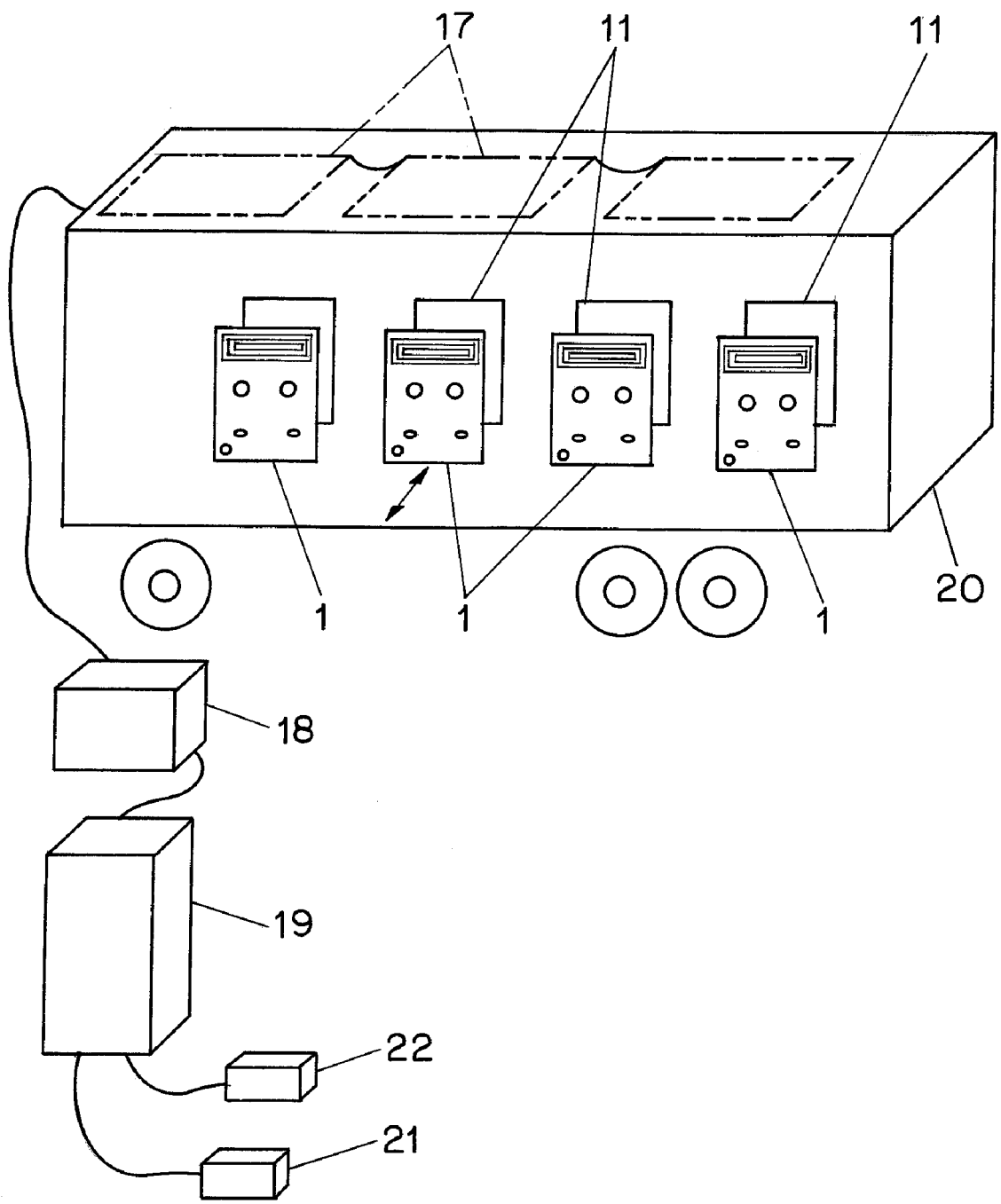
FIG. 6 is a schematic view of a number of low frequency RF tags attached to freight packages in a truck repository, together with a large loop antenna and other components for reading the tags and communicating the information to the internet or elsewhere.

FIG. 6 shows a similar system as is depicted in FIG. 5, except that it is contained in the trailer of a truck 20 as the repository for the freight boxes 11. Again the system comprises a truck server 19 and an optional in-truck data communications means 21, which comprise a digital cell phone or satellite link. An optional in truck GPS system 22 may also be included as an input to the server 19. The server 19 then sends commands to a base station 18 (similar to the one depicted in FIG. 5) which may in turn connect to an array of antennas 17 that may be placed either in the ceiling of the truck 20 or in its floor to provide for full two way communication (reception/transmission, or "Rx/Tx") between server 19 and tags 1.

The server 19 may, on a regular basis, interrogate all tags 1 contained in the truck 20, locate tags 1 that are not contained in the database of server 19 and provide real-time confirmation of manifest or status of the freight 11. By using the GPS input 22 about the changing location of truck 20 during its travels, this GPS information may be added to the information in the database of server 19 to thereby provide real-time tracking of individual freight items 11 as the truck 20 travels. In addition the server 19 may confirm the status or condition of the freight 11 (e.g. temperature, angle etc. in real-time) by reading the sensors 15 and transmitting them via the in-truck data communications system 21. When the truck 20 reaches its destination the time and date of arrival can be placed in the log of the NRF tag 1 as an additional method of tracking the freight 11 to which tag 1 is attached. Moreover, such real-time tracking can be carried out via the internet if IP addresses are provided for the server 19 or for individual NRF tags 1.

Figure 7:
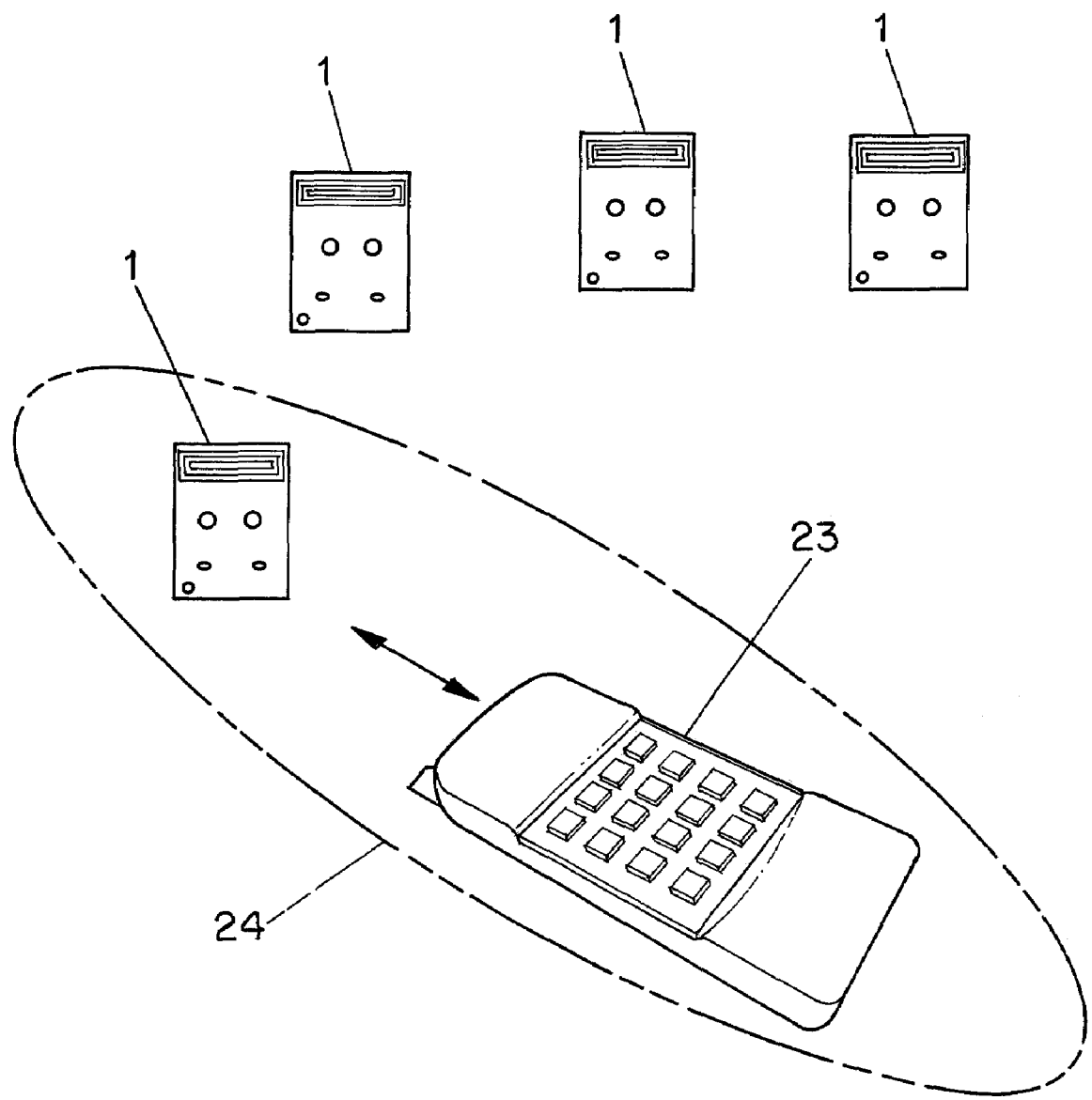
FIG. 7 is a schematic view showing the use of a handheld reader to interrogate a selected individual RF tag.

FIG. 7 shows the handheld reader 23 with a limited transmission and reception range 24. By limiting the loop size of the antenna 17 (not shown) that is contained in the handheld reader 23, as well as in the tag 1 itself, the handheld reader 23 may be used selectively communicate with an individual tag 1 by disposing reader 23 to within a distance of a few loop diameters of the handheld's antenna 17. This limited range ability can only be achieved easily when using low-frequency (not exceeding 1 megahertz) loop communications. This ability makes it possible to selectively read, and write information to a selected tag 1 without prior knowledge of the tag's ID. Moreover, a worker may walk up to a piece of freight 11 with the handheld reader 23 properly programmed and read destination, current temperature and any other information from tag 1 by simply placing the handheld reader within 45 inches of the selected tag 1 and moving reader 23 back-and-forth along the direction of the 2-headed arrow, in much the same way as a bar-code might be scanned.

Figure 8:
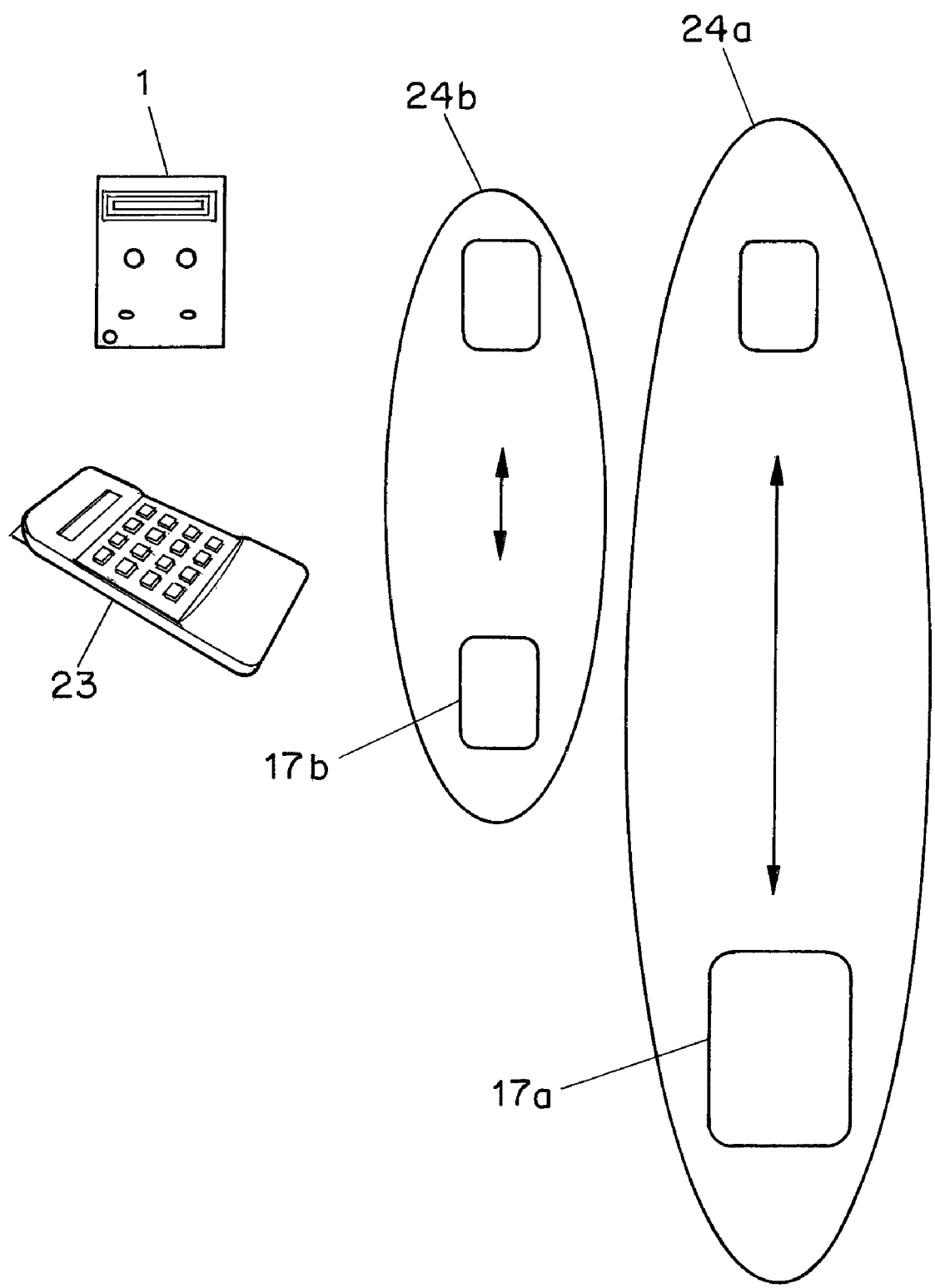
FIG. 8 is a schematic view showing the use of a handheld reader to interrogate RF tags with reader; antennas of different sizes for different communication ranges.

FIG. 8 shows that the distance between the hand-held and the tag for effective communications may be altered by simply changing the size of the small loop antennas. If a large antenna 17a is used in the handheld reader 23, the transmission reception range (Rx/Tx) 24a can be several feet, while the Rx/Tx range 24b of a smaller antenna 17b may be limited to several inches. This ability to alter the range by designing optimal size of antenna 17 makes programmability and reading simple and low-cost.

Figure 9:
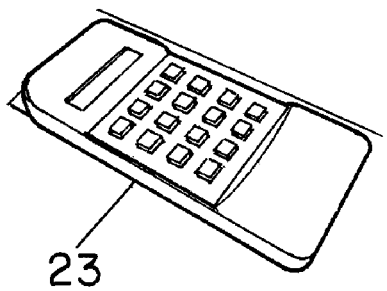
FIG. 9 is a flowchart using block diagrams to describe the use of the invention and its use with the novel RF tags and other components.
Figure 9:
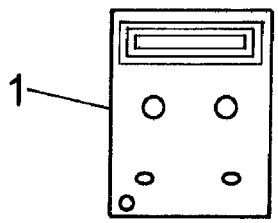
Figure 9:
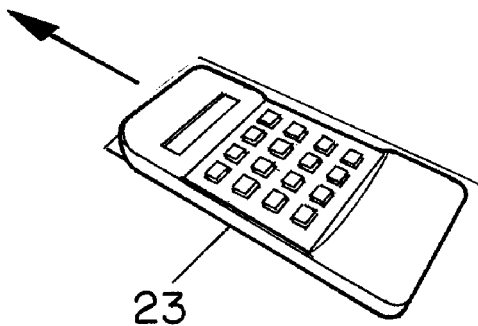
Figure 9:
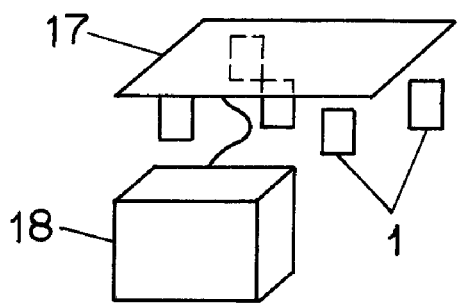

FIG. 9 shows a typical flowchart for use of these freight NRF detection tags 1. In Step 1, the handheld reader ("handheld") 23 may read a bar-code or simply be manually programmed to write to the tag 1 at the shipment location. The waybill number or ID number may thus be programmed into the tag 1.

In Step 2 the tag 1 may be placed on the freight box 11, with tape, TAF, or other attachment means. The tag 1 may also be programmed with its ID and other information after tag 1 is attached to the freight 11. Again, this can be done with the handheld reader 23.

At Step 3, the handheld 23 transfers, to the server 19 (not shown), the data and information that handheld 23 has programmed into the tag 1. This information may include the waybill number, shipment ID or other specific information that allows the large array antenna 17 of the base station 18 (see FIGS. 5 and 6) to identify and read tags 1 throughout the shipment life cycle for a freight package 11. This data transfer may take place through the loop antenna 17 in the same way that the tag 1 and large loop antenna 17 communicate, or it may take place with a modem and phone line, or it may take place with a plug connected directly to the server 19 and the handheld 23.

At Step 4, the base station large antenna array 17 can now freely interrogate tags 1 to track, sort and identify the freight 11 as it moves through the warehouse/truck delivery supply chain.

FIG. 10 lists a number of functions and advantageous features unique to the low frequency RF tags, method, and system of the invention, as follows:

1. Internal Transaction Data Log (Reads Writes+GPS)
2. Internal Temp Data Log (one month@1/hr)
3. Internal Humidity Data Log (one month@1/hr)
4. Internal Tilt Data Log (Events Log as needed)
5. Internal Jog Data Log (Events Log as needed)
6. Paperless Electronic Waybill
7. Automatic Freight Sort Based on Electronic Waybill
8. Real Time Freight Tracking (Trucks+Warehouse)
9. Real Time Truck Manifest
10. Real Time Data Logs
11. Real Time Web Enabled Reports ("8 "11").
12. Pick/Put Sorts of Freight (LED based)
13. Low Cost Tags (4 micron CMOS IC's)
14. Low Power Extended Battery Life (15 years)—due to Low Frequency RF (<1 MHz), for example 300 KHz
15. Low Cost Handhelds
16. Network of Tags within Large Loop Antenna
17. Individual Tag Reads and Writes (e.g. Conveyor)
18. Fully Programmable ID
19. No Fixed ID Required
20. Tags Secure On Package Using TAF
21. Tags "Retrievable" upon Delivery
22. Tags "Reusable" 100,000 or more transactions.

While the present invention has been described with reference to preferred embodiments thereof, numerous obvious changes and variations may readily be made by persons skilled in the fields of radio frequency tags and logistics. Accordingly, the invention should be understood to include all such variations to the full extent embraced by the claims.

The invention claimed is:

1. A system for detection and tracking of animate objects, namely people, said system comprising:
    a) a low radio frequency tag carried by each of the people, said tag comprising
    a tag antenna operable at a low radio frequency not exceeding 1 megahertz,
    a transceiver operatively connected to said antenna, said transceiver being operable to transmit and receive data signals at said low radio frequency,
    a data storage device operable to store data comprising identification data for identifying said detection tag,
    a programmed data processor operable to process data received from said transceiver and said data storage device and to send data to cause said transceiver to emit an identification signal based upon said identification data stored in said data storage device, and
    an energy source for activating said transceiver and said data processor;
    b) at least one field antenna disposed at an orientation and within a distance from each person that permits effective communication therewith at said low radio frequency;
    c) a reader in operative communication with said field antenna, said reader being operable to receive data signals from said low frequency tags;
    d) a transmitter in operative communication with said field antenna, said transmitter being operable to send data signals to said low frequency tags; and
    e) a central data processor (e.g. server) in operative communication with said reader and transmitter.

2. A system as set forth in claim 1, said low radio frequency not exceeding 300 kilohertz.

3. A system as set forth in claim 2, said field antenna comprising a large loop, said distance from said field antenna to each person not exceeding a major dimension of said loop.

4. A system as set forth in claim 3, said people and said field antenna being disposed in a retail area selected from a retail store and a hotel, said field antenna comprising a large loop, said distance from said field antenna to each person not exceeding a major dimension of said loop.

5. A system as set forth in claim 1, said field antenna, said reader, and said transmitter being combined into a unitary handheld device.

6. A system as set forth in claim 1, said tag further comprising a display (e.g. LCD) operable to display data relating to said tag and a person carrying said tag.

7. A system as set forth in claim 1, said tag further comprising key buttons operable for manual entry of data.

8. A system as set forth in claim 1, said transceiver being normally ON to receive data signals.

9. A system as set forth in claim 8 that can transmit a signal when a condition related to a sensor meets a preselected value.

10. A system as set forth in claim 9, said sensor further comprising a GPS detector.

11. A system as set forth in claim 1, said programmed data processor of said tag being operable to compare a transmitted ID code with a stored ID code and, in the event of a match, to respond to said transmitted ID code.

12. A system as set forth in claim 11, said programmed data processor of said tag being operable to compare a transmitted ID code from a server to a plurality of ID codes stored in said data storage device of said tag and, in the event of a match, to respond to said transmitted ID code.

13. A system as set forth in claim 12, wherein the data storage device is programmable to store said plurality of ID codes.

14. A system as set forth in claim 11 wherein said stored ID codes that are programmable to enable erasure thereof and thereafter programming of other ID codes in said data storage device.

15. A detection tag for detection and tracking of animate and inanimate objects, said detection tag comprising:
    a) an antenna operable at a low radio frequency not exceeding 1 megahertz;
    b) a transceiver operatively connected to said antenna, said transceiver being operable to transmit and receive data signals at said low radio frequency;
    c) a data storage device operable to store data comprising identification data for identifying said detection tag;
    d) a data processor operable to process data received from said transceiver and said data storage device and to send data to cause said transceiver to emit an identification signal based upon said identification data stored in said data storage device; and e) an energy source for activating said transceiver and said data processor.

16. A detection tag as set forth in claim 15, and further comprising a display (e.g. LCD) operable to display data relating to said tag and a person carrying said tag.

17. A detection tag as set forth in claim 15, and further comprising key buttons operable for manual entry of data.

18. A detection tag as set forth in claim 15, said transceiver being normally ON to receive data signals.

19. A detection tag as set forth in claim 18 that can transmit a signal when a condition related to a sensor meets a threshold value.

20. A detection tag as set forth in claim 15, said programmed data processor of said tag being operable to compare a transmitted ID code with a stored ID code and, in the event of a match, to respond to said transmitted ID code.

21. A detection tag as set forth in claim 20, said programmed data processor of said tag being operable to compare a transmitted ID code from a server to a plurality of ID codes stored in said data storage device of said tag and, in the event of a match, to respond to said transmitted ID code.

22. A detection tag as set forth in claim 21, wherein the data storage device is programmable to store said plurality of ID codes.

* * * * *